US011703638B2

(12) United States Patent
Ko et al.

(10) Patent No.: US 11,703,638 B2
(45) Date of Patent: Jul. 18, 2023

(54) SINGLE-PHOTON SOURCE DEVICE AND SINGLE-PHOTON SOURCE SYSTEM INCLUDING THE SAME

(71) Applicant: ELECTRONICS AND TELECOMMUNICATIONS RESEARCH INSTITUTE, Daejeon (KR)

(72) Inventors: Young-Ho Ko, Daejeon (KR); Kap-Joong Kim, Daejeon (KR); Hye Min Kim, Daejeon (KR); Mireu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/513,820

(22) Filed: Oct. 28, 2021

(65) Prior Publication Data

US 2022/0171124 A1    Jun. 2, 2022

(30) Foreign Application Priority Data

Nov. 30, 2020 (KR) .................. 10-2020-0164670
Sep. 1, 2021 (KR) .................. 10-2021-0116225

(51) Int. Cl.
  *G02B 6/12* (2006.01)
  *H04B 10/50* (2013.01)
(52) U.S. Cl.
  CPC ....... *G02B 6/12004* (2013.01); *H04B 10/502* (2013.01); *H04B 10/503* (2013.01); *G02B 2006/1215* (2013.01); *G02B 2006/12121* (2013.01); *G02B 2006/12123* (2013.01)

(58) Field of Classification Search
  CPC ...... G02B 6/12004; G02B 2006/12121; G02B 2006/12123; G02B 2006/1215; H04B 10/502; H04B 10/503
  USPC ......................................... 385/14
  See application file for complete search history.

(56) References Cited

U.S. PATENT DOCUMENTS

| 5,835,458 A * | 11/1998 | Bischel ............... G11B 7/1353 |
| | | 369/44.29 |
| 2009/0034737 A1 | 2/2009 | Trifonov |
| 2012/0051689 A1* | 3/2012 | Okayama ........... G02B 6/12007 |
| | | 385/14 |
| 2013/0156369 A1 | 6/2013 | Park et al. |
| 2014/0192827 A1 | 7/2014 | Oh |

(Continued)

OTHER PUBLICATIONS

Anshuman Singh et al., "Quantum frequency conversion of a quantum dot single-photon source on a nanophotonic chip", Optica, vol. 6, No. 5, Apr. 30, 2019.

(Continued)

*Primary Examiner* — Jerry M Blevins
(74) *Attorney, Agent, or Firm* — Rabin & Berdo, P.C.

(57) ABSTRACT

Provided are a single-photon source device and a single-photon source system including same. The single-photon source device includes a substrate, a straight waveguide extending in a first direction on the substrate, a first coupling layer which is provided on the straight waveguide and has a first point defect, at least one first electrode which is adjacent to the first point defect and provided on the first coupling layer, a ring waveguide which is adjacent to the straight waveguide and provided on the substrate, and at least one second electrode provided on the ring waveguide.

17 Claims, 9 Drawing Sheets

(56) References Cited

U.S. PATENT DOCUMENTS

2020/0209656 A1* 7/2020 Young .................. H04L 9/0852
2020/0243601 A1 7/2020 Orcutt et al.

OTHER PUBLICATIONS

Junfeng Wang et al., "Bright room temperature single photon source at telecom range in cubic silicon carbide", Nature communications, 9, article No. 4106, Oct. 5, 2018.

* cited by examiner

SINGLE-PHOTON SOURCE DEVICE AND SINGLE-PHOTON SOURCE SYSTEM INCLUDING THE SAME

CROSS-REFERENCE TO RELATED APPLICATIONS

This U.S. non-provisional patent application claims priority under 35 U.S.C. § 119 of Korean Patent Application Nos. 10-2020-0164670, filed on Nov. 30, 2020, and 10-2021-0116225, filed on Sep. 1, 2021, the entire contents of which are hereby incorporated by reference.

BACKGROUND

The present disclosure herein relates to a single-photon source system, and particularly, to a single-photon source device in a communication wavelength band and a single-photon source system including same.

Generally, in quantum cryptography communication, information may be exchanged by using light of a single photon. In a light source of a typical quantum cryptography communication, a laser beam is used in a manner in which the intensity of the laser beam is attenuated to be a single photon or lower. A single-photon source enables quantum cryptography communication having complete security because the number of photons simultaneously produced per time is only one.

SUMMARY

The present disclosure provides a single-photon source device capable of increasing extraction efficiency of a single photon, and a single-photon source system including same.

Disclosed is a single-photon source device. An embodiment of the inventive concept provides a single-photon source device including: a substrate; a straight waveguide extending in a first direction on the substrate; a first coupling layer which is provided on the straight waveguide and has a first point defect; at least one first electrode which is adjacent to the first point defect and provided on the first coupling layer; a ring waveguide which is adjacent to the straight waveguide; and at least one second electrode provided on the ring waveguide.

In an embodiment, the single-photon source device may further include a second coupling layer which is provided on the ring waveguide and has a second point defect.

In an embodiment, each of the first coupling layer and the second coupling layer may include silicon carbide.

In an embodiment, each of the first point defect and the second point defect may include a silicon vacancy, a silicon di-vacancy, or a carbon antisite-vacancy pair.

In an embodiment, each of the ring waveguide and the second coupling layer may have a circular shape.

In an embodiment, the first point defect and the second point defect may be disposed adjacent to each other.

In an embodiment, the first electrode may be provided on one side of the first point defect, and the second electrode may be provided on the other side of the second point defect and disposed inside the second coupling layer and the ring waveguide.

In an embodiment, the first coupling layer may have a ship shape.

In an embodiment, each of the straight waveguide and the ring waveguide may include silicon or silicon nitride.

In an embodiment, the single-photon source device may further include a lower clad layer below the straight waveguide and the ring waveguide. The lower clad layer may include silicon oxide.

In an embodiment of the inventive concept, a single-photon source device includes: a substrate; a lower clad layer provided on the substrate; a straight waveguide which is provided on the lower clad layer and extends in a first direction; a first coupling layer which is provided on the straight waveguide and has a first point defect; a ring waveguide which is provided adjacent to the straight waveguide and disposed on the lower clad layer; and a second coupling layer which is provided on the ring waveguide and has a second point defect adjacent to the first point defect.

In an embodiment, the single-photon source device may further include an upper clad layer which is provided on the lower clad layer on the outside of the straight waveguide and the ring waveguide.

In an embodiment, the single-photon source device may further include a first electrode which is provided on the first coupling layer and the upper clad layer on one side of the first point defect.

In an embodiment, the single-photon source device may further include a second electrode which faces the first electrode and is provided on the second coupling layer and the upper clad layer on the other side of the second point defect.

In an embodiment, each of the upper clad layer and the lower clad layer may include silicon oxide.

In an embodiment of the inventive concept, a single-photon source system includes: a first light source configured to provide first light; and a single-photon source device which is provided on one side of the first light source and uses the first light to generate a single photon. Here, the single-photon source device may include: a substrate; a straight waveguide extending in a first direction on the substrate; a first coupling layer which is provided on the straight waveguide and has a first point defect; at least one first electrode which is adjacent to the first point defect and provided on the first coupling layer; a ring waveguide which is adjacent to the straight waveguide; and at least one second electrode provided on the ring waveguide.

In an embodiment, the single-photon source system may further include a second light source which is adjacent to the first light source and provides second light.

In an embodiment, each of the first light source and the second light source may include a light emitting diode or a laser diode.

In an embodiment, the single-photon source system may further include a beam splitter provided between the first light source and the second light source.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
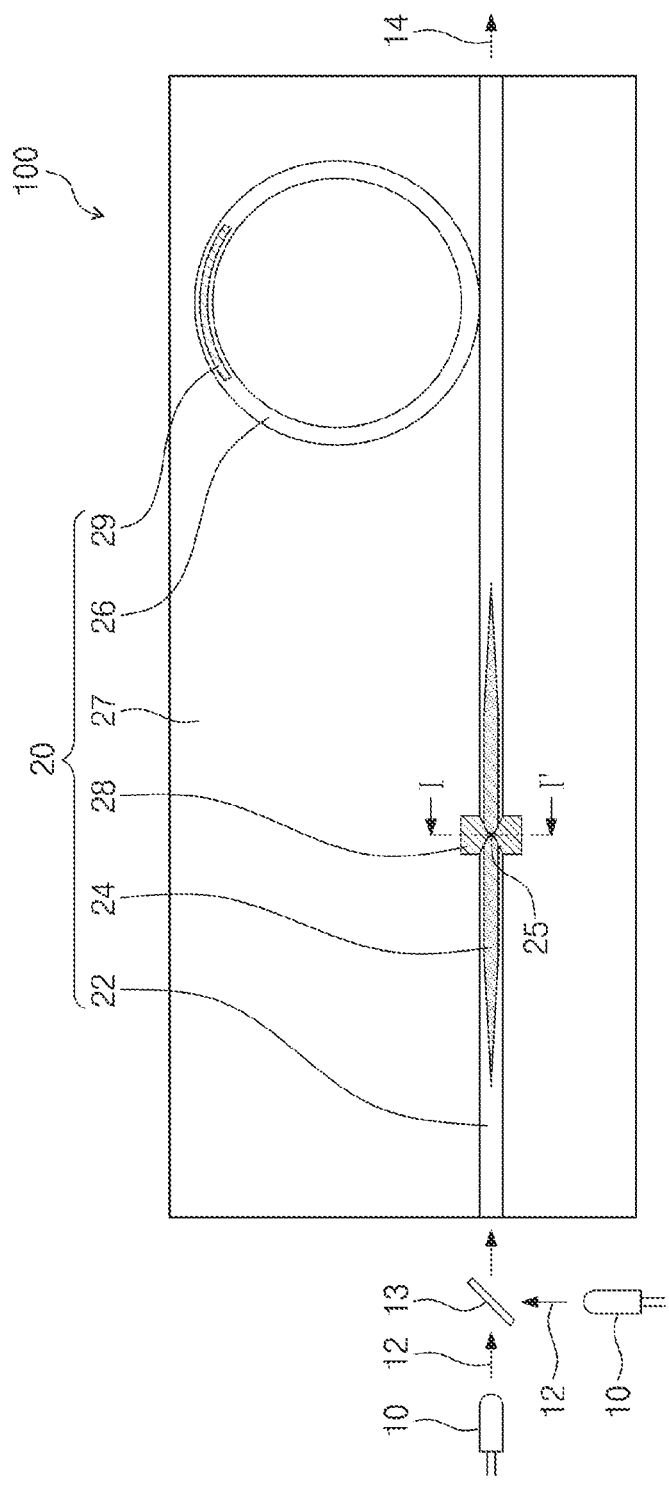
FIG. 1 is a plan view showing one example of a single-photon source system according to the inventive concept.

Hereinafter, embodiments of the inventive concept will be described in detail with reference to the accompanying drawings. Advantages and features of the present disclosure, and implementation methods thereof will be clarified through following embodiments described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the concept of the present disclosure to those skilled in the art. Further, the present disclosure is only defined by scopes of claims. Like reference numerals refer to like elements throughout.

The terms used in this specification are used only for explaining embodiments while not limiting the present disclosure. In this specification, the singular forms include the plural forms as well, unless the context clearly indicates otherwise. The meaning of 'comprises' and/or 'comprising' used in the specification does not exclude the presence or addition of one or more components, steps, operations, and/or elements other than the mentioned components, steps, operations, and/or devices. Also, this specification may be understood by the meaning mainly used in the field of optical communication. Since preferred embodiments are provided below, the order of the reference numerals given in the description is not limited thereto.

The foregoing description is about detailed examples for practicing the inventive concept. The present disclosure includes not only the above-described embodiments but also simply changed or easily modified embodiments. In addition, the present disclosure may include techniques which may be easily modified and practiced by using the embodiments described above.

FIG. 1 shows one example of a single-photon source system 100 according to the inventive concept.

Referring to FIG. 1, the single-photon source system 100 according to an embodiment of the inventive concept may include first light sources 10 and a single-photon source device 20.

First light 12 may be generated by each of the first light sources 10 and then provided to the single-photon source device 20. For example, the first light sources 10 may include a light emitting diode or a laser diode. The first light 12 may have a plurality of different wavelengths. The first light 12 may be pump light or excitation light of a laser beam, but the embodiment of the inventive concept is not limited thereto.

A beam splitter 13 may be provided between the first light sources 10. A portion of the first light 12 may be transmitted through the beam splitter 13 toward the single-photon source device 20, and another portion of the first light 12 may be reflected from the beam splitter 13 toward the single-photon source device 20.

The single-photon source device 20 may use the first light 12 to generate a single photon 14. The single photon 14 may be an optical signal having a level of a single photon, but the embodiment of the inventive concept is not limited thereto.

Figure 2:
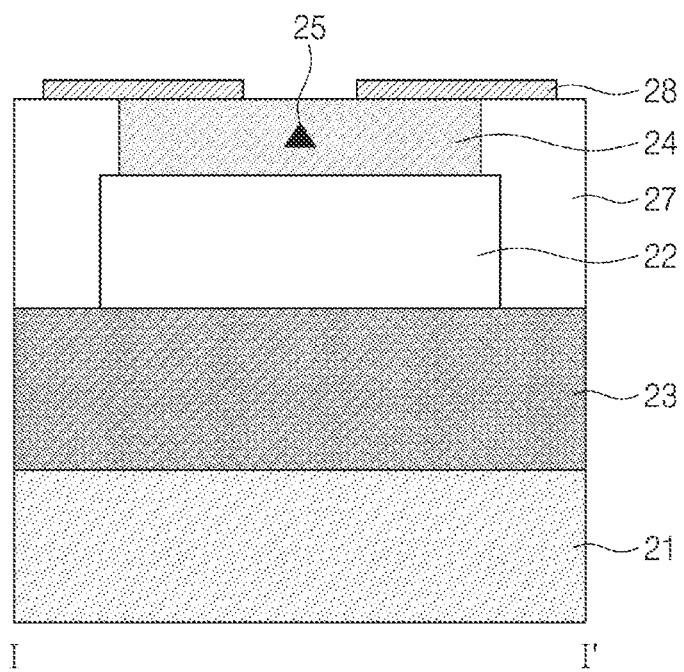
FIG. 2 is a cross-sectional view taken along line I-I' of FIG. 1.

FIG. 2 shows a view taken along line I-I' of FIG. 1.

Referring to FIG. 1 and FIG. 2, the single-photon source device 20 may include a substrate 21, a lower clad layer 23, a straight waveguide 22, a first coupling layer 24, a ring waveguide 26, first electrodes 28, and a second electrode 29.

The substrate 21 may support the lower clad layer 23, the straight waveguide 22, and the ring waveguide 26. The substrate 21 may include a silicon wafer, but the embodiment of the inventive concept is not limited thereto.

The lower clad layer 23 may be provided on the substrate 21. The lower clad layer 23 may include silicon oxide ($SiO_2$). The lower clad layer 23 may have a lower refractive index than the straight waveguide 22 and the ring waveguide 26.

The straight waveguide 22 may be provided on the substrate 21 and the lower clad layer 23. The straight waveguide 22 may extend in a first direction from one side of the substrate 21 and the lower clad layer 23 to the other side thereof. The straight waveguide 22 may have a higher refractive index than the lower clad layer 23. The straight waveguide 22 may include crystalline silicon and/or epitaxial silicon. On the other hand, the straight waveguide 22 may include silicon nitride (SiN), but the embodiment of the inventive concept is not limited thereto. For example, the straight waveguide 22 may have a width or thickness of about 50 nm to about 1 μm.

The first coupling layer 24 may be provided on the straight waveguide 22. The first coupling layer 24 may have a ship shape in a plan view. The first coupling layer 24 may include crystalline silicon carbide (SiC) or epitaxial silicon carbide. Although not illustrated, the first coupling layer 24 may be doped with conductive impurities, but the embodiment of the inventive concept is not limited thereto. According to one example, the first coupling layer 24 may have a first point defect 25.

The first point defect 25 may be provided inside the first coupling layer 24. The first point defect 25 may include a silicon vacancy, a silicon di-vacancy, or a carbon antisite-vacancy pair, but the embodiment of the inventive concept is not limited thereto. The first point defect 25 may absorb the first light 12 to obtain a gain of the single photon 14. Also, the first point defect 25 may use an electric field (not shown) between the first electrodes 28 to obtain the gain of the single photon 14. On the other hand, the first point defect 25 may generate the single photon 14, but the embodiment of the inventive concept is not limited thereto. Thus, the single-photon source device 20 of an embodiment of the inventive concept may use the first point defect 25 to increase extraction efficiency of the single photon 14.

An upper clad layer 27 may be provided on the lower clad layer 23 on the outside of the straight waveguide 22 and the first coupling layer 24. The upper clad layer 27 may be provided on the outside and inside of the ring waveguide 26. The upper clad layer 27 may have the same refractive index as the lower clad layer 23. The upper clad layer 27 may include silicon oxide ($SiO_2$).

The first electrodes 28 may be provided on the first coupling layer 24 and the upper clad layer 27 on both sides of the first point defect 25. The first electrodes 28 may provide first source voltage (not shown) to the first point defect 25 and generate the single photon 14. That is, the first coupling layer 24, the first point defect 25, and the first electrodes 28 may serve as resonators of the single photon 14. The first electrodes 28 may include metals of titanium (Ti), platinum (Pt), nickel (Ni), and gold (Au). Each of the first electrodes 28 may have a width of about 500 nm or less, but the embodiment of the inventive concept is not limited thereto.

The ring waveguide 26 may be provided adjacent to the straight waveguide 22. The ring waveguide 26 may have a circular ring shape in a plan view. The ring waveguide 26 may include the same material as the straight waveguide 22. For example, the ring waveguide 26 may include crystalline silicon or silicon nitride. The ring waveguide 26 may have a width or thickness of about 50 nm to about 1 μm. The ring waveguide 26 may serve as a resonator of the single photon 14.

The second electrode 29 may be provided on the ring waveguide 26. The second electrode 29 may provide second source voltage (not shown) into the ring waveguide 26 and tune a wavelength of the single photon 14. The ring waveguide 26 and the second electrode 29 may serve as a wavelength converter and a wavelength tuner, but the embodiment of the inventive concept is not limited thereto.

Figure 3:
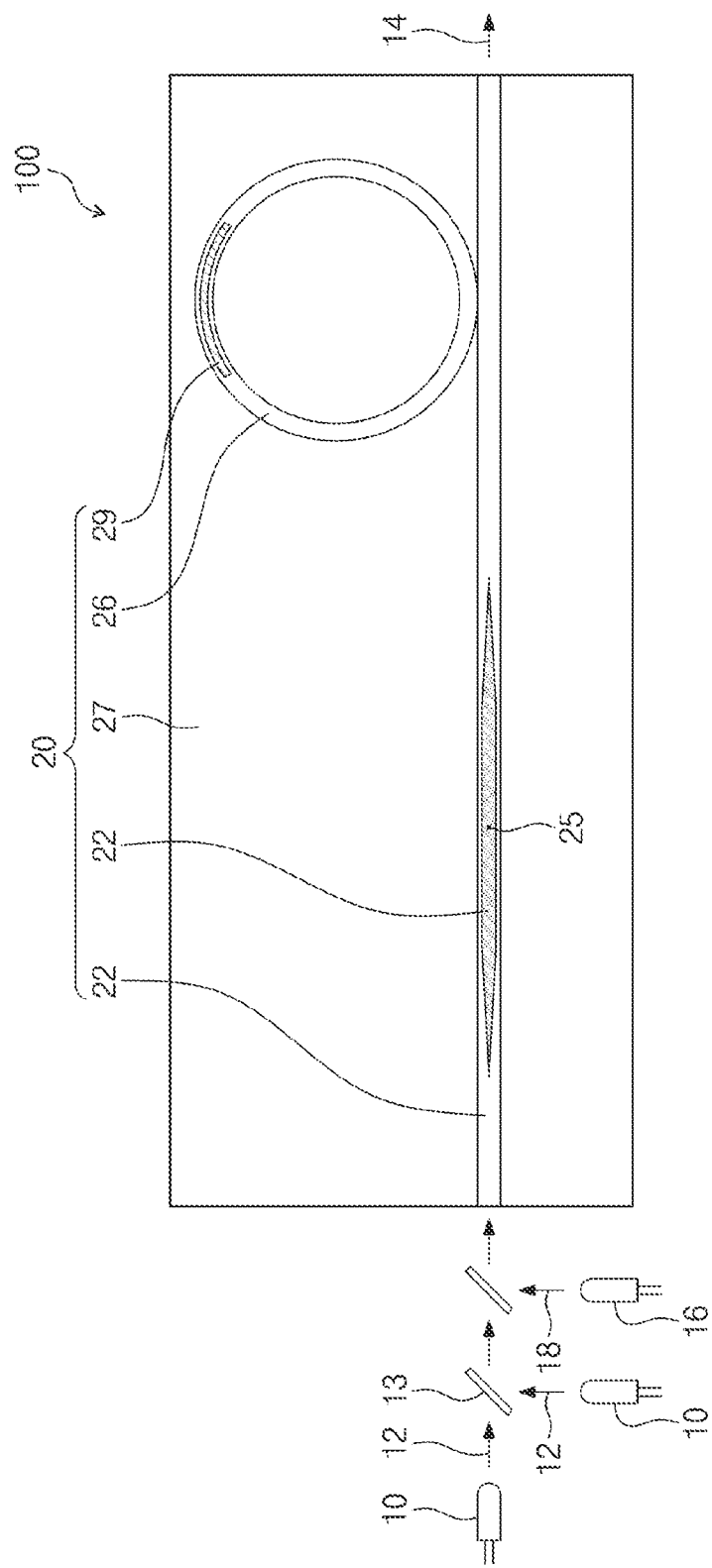
FIG. 3 is a plan view showing one example of a single-photon source system according to the inventive concept.

FIG. 3 shows one example of a single-photon source system 100 according to the inventive concept.

Referring to FIG. 3, the single-photon source system 100 of an embodiment of the inventive concept may further include a second light source 16. The second light source 16 may be provided between the first light source 10 and the straight waveguide 22. The second light source 16 may be different from or the same as the first light source 10. The second light source 16 may include a light emitting diode or a laser diode. The second light source 16 may provide second light 18 into the straight waveguide 22 and generate the single photon 14 inside the first coupling layer 24. The second light 18 may have a wavelength different from a wavelength of the first light 12. On the other hand, the second light 18 may have the same wavelength as the first light 12. The beam splitters 13 or dichroic mirrors may be provided between the first light sources 10 and between the first light sources 10 and the second light source 16. The first light 12 may be transmitted through the beam splitters 13 toward the straight waveguide 22, and the second light 18 may be reflected from the beam splitters 13 toward the straight waveguide 22. The second light 18 may generate the single photon 14 inside the first coupling layer 24 without an electric field within the first point defect 25. That is, the first electrodes 28 of FIG. 1 and FIG. 2 may be removed and/or omitted by the second light 18 of the second light source 16.

The lower clad layer 23, the straight waveguide 22, the first coupling layer 24, the ring waveguide 26, and the second electrode 29 may have the same configuration as shown in FIG. 1.

Figure 4:
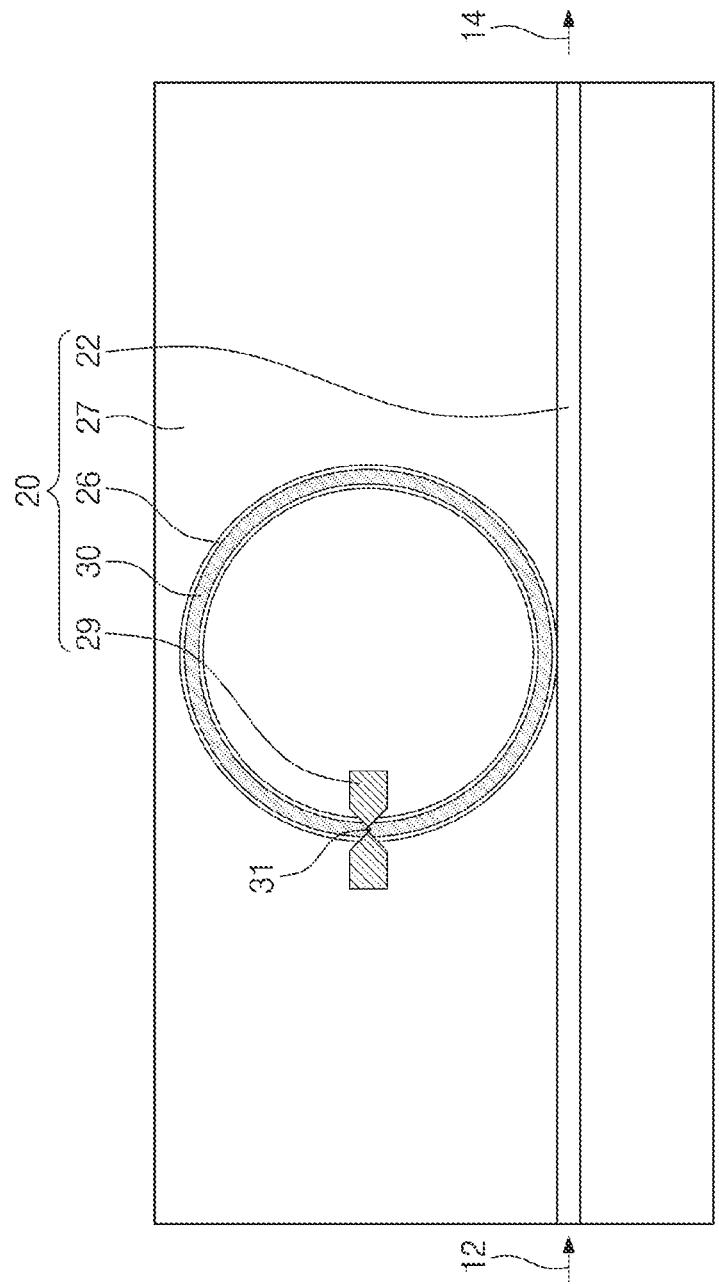
FIG. 4 is a plan view showing one example of a single-photon source device of FIG. 1.

FIG. 4 shows one example of the single-photon source device 20 of FIG. 1.

Referring to FIG. 4, the single-photon source device 20 may further include a second coupling layer 30.

The second coupling layer 30 may be provided on the ring waveguide 26. The second coupling layer 30 may have the same shape as the ring waveguide 26. The second coupling layer 30 may have a circular ring shape in a plan view. For example, the second coupling layer 30 may include silicon carbide. According to one example, the second coupling layer 30 may have a second point defect 31. The second point defect 31 may be provided within one side of the second coupling layer 30. The second point defect 31 may be the same as the first point defect 25 of FIG. 1. For example, the second point defect 31 may include a silicon vacancy, a silicon di-vacancy, or a carbon antisite-vacancy pair, but the embodiment of the inventive concept is not limited thereto.

The second electrodes 29 may be provided on the second coupling layer 30 on both sides of the second point defect 31. When second source voltage is provided into the second electrodes 29, the second electrodes 29 may induce an electric field inside the second point defect 31 to generate the single photon 14. The second point defect 31 and the second electrodes 29 may serve as resonators of the single photon 14. Furthermore, the second coupling layer 30, the second point defect 31, and the second electrodes 29 may remove and/or omit the first coupling layer 24, the first point defect 25, and the first electrode 28 of FIG. 1.

The lower clad layer 23 and the straight waveguide 22 may be constituted in the same manner as in FIG. 1.

Figure 5:
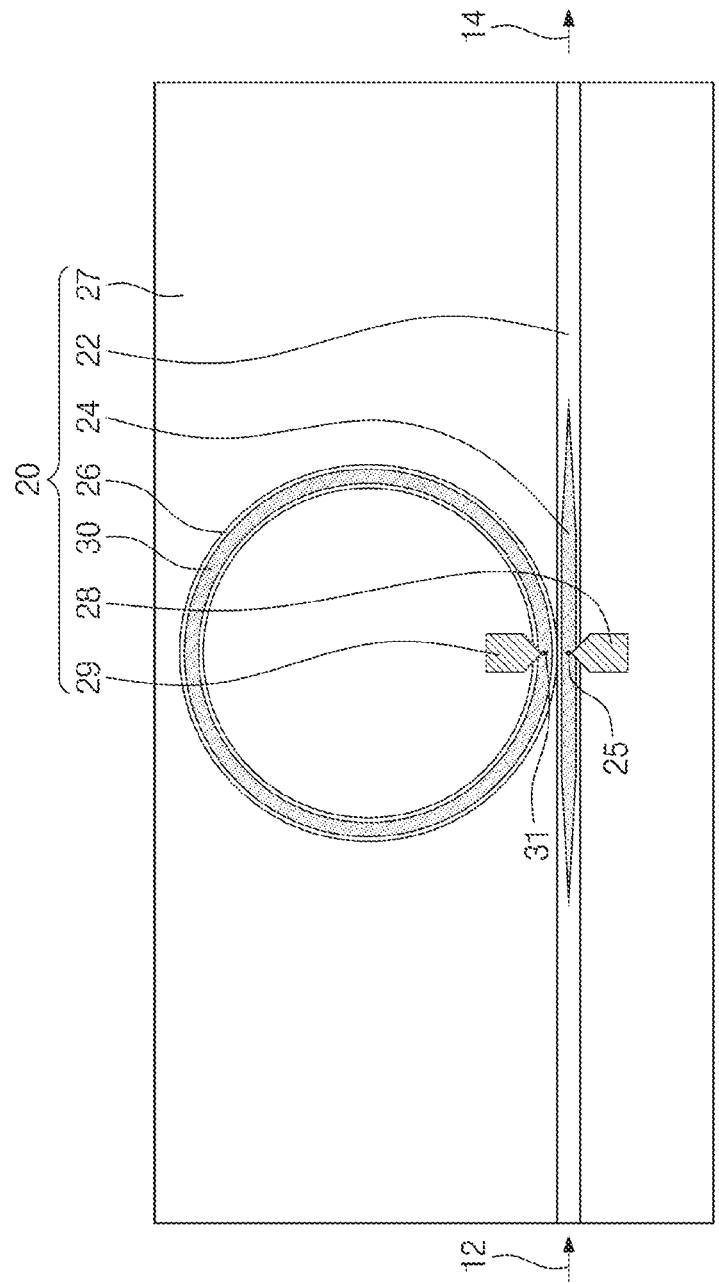
FIG. 5 is a plan view showing one example of a single-photon source device of FIG. 1.

FIG. 5 shows one example of the single-photon source device 20 of FIG. 1.

Referring to FIG. 5, the first coupling layer 24 and the second coupling layer 30 of the single-photon source device 20 may be disposed adjacent to each other. The first coupling layer 24 and the second coupling layer 30 may have the first point defect 25 and the second point defect 31, respectively. The first point defect 25 and the second point defect 31 may be provided adjacent to each other. The first point defect 25 may include a silicon vacancy, a silicon di-vacancy, or a carbon antisite-vacancy pair of the first coupling layer 24. Similarly, the second point defect 31 may include a silicon vacancy, a silicon di-vacancy, or a carbon antisite-vacancy pair.

The first electrode 28 may be provided on one side of the first point defect 25, and the second electrode 29 may be provided inside the ring waveguide 26 on the other side of the second point defect 31. The first electrode 28 may be provided on the first coupling layer 24 and the upper clad layer 27 on one side of the first point defect 25. The second electrode 29 may be provided on the second coupling layer 30 and the upper clad layer 27 on the other side of the second point defect 31.

The first point defect 25 and the second point defect 31 may be provided between the first electrode 28 and the second electrode 29.

When source voltage is provided to the first electrode 28 and the second electrode 29, the first point defect 25 may generate a gain of the single photon 14. The second point defect 31 may tune and/or change a wavelength of the single photon 14.

The straight waveguide 22 and the ring waveguide 26 may be configured in the same manner as in FIG. 1.

Figure 6:
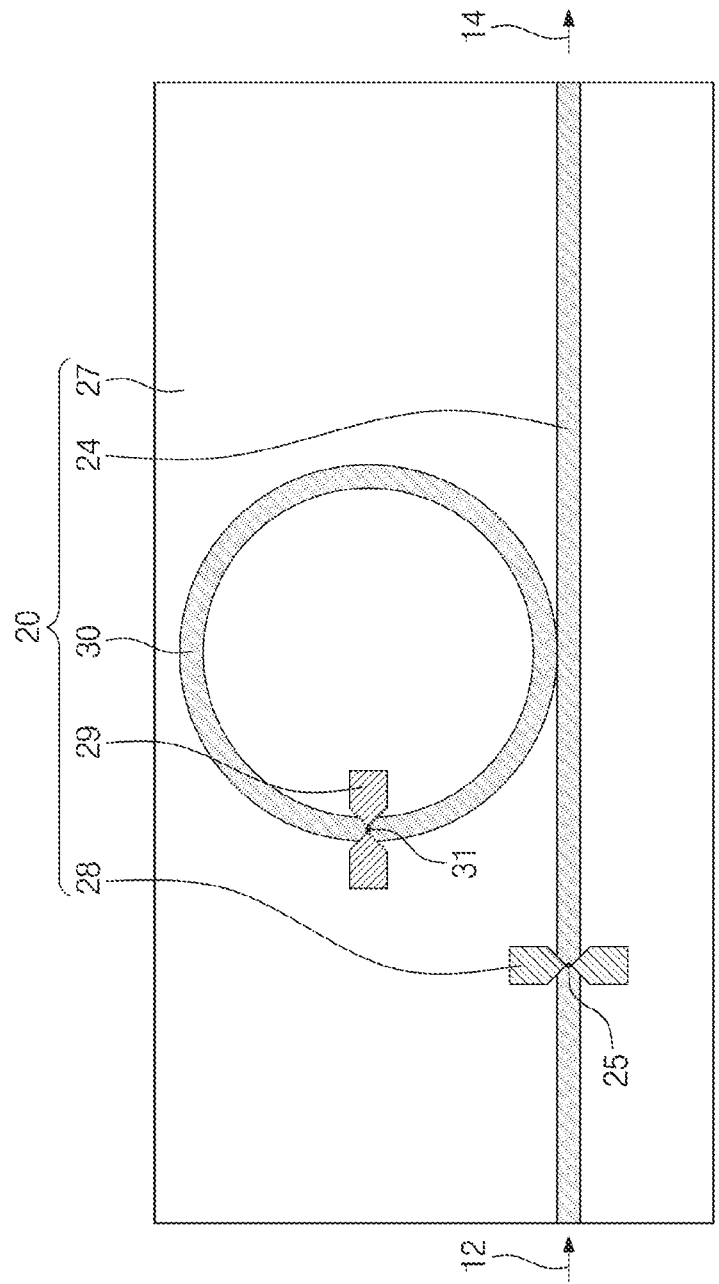
FIG. 6 is a plan view showing one example of a single-photon source device of FIG. 1.

FIG. 6 shows one example of the single-photon source device 20 of FIG. 1.

Referring to FIG. 6, the first coupling layer 24 and the second coupling layer 30 of the single-photon source device 20 may have the same shapes as the straight waveguide 22 and the ring waveguide 26 of FIG. 1, respectively. The first coupling layer 24 may have a straight shape. The second coupling layer 30 may have a ring shape.

The first electrodes 28 may be provided on both sides of the first point defect 25 within the first coupling layer 24. The second electrodes 29 may be provided on both sides of the second point defect 31 within the second coupling layer 30.

Although not illustrated, the first coupling layer 24 and the second coupling layer 30 may be provided on the straight waveguide 22 and the ring waveguide 26 of FIG. 1, respectively, but the embodiment of the inventive concept is not limited thereto.

Figure 7:
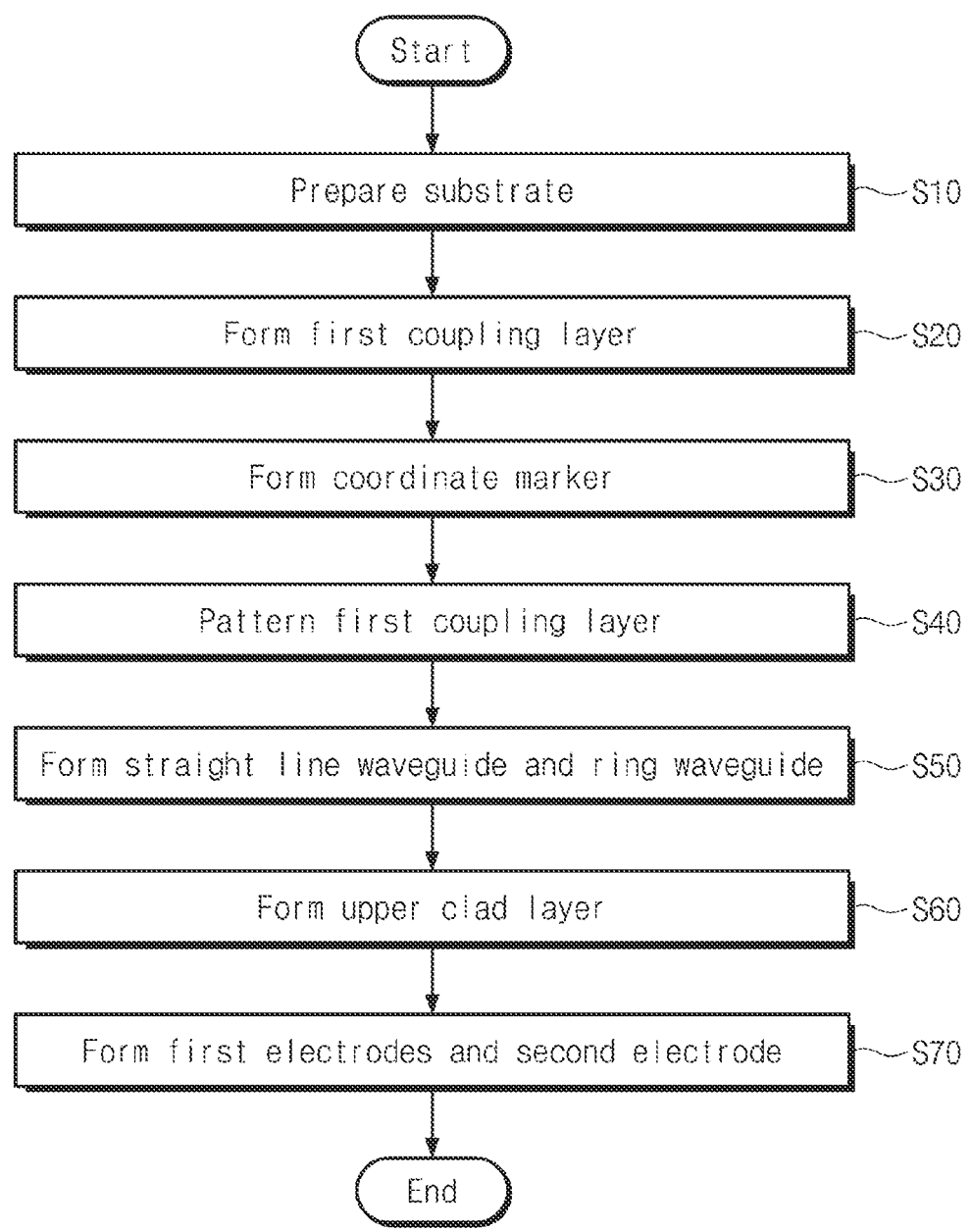
FIG. 7 is a flowchart showing a manufacturing method of a single-photon source device of FIG. 2.

FIG. 7 shows a manufacturing method of the single-photon source device 20 of FIG. 2. FIG. 8 to FIG. 11 are cross-sectional views of processes for the single-photon source device 20 of FIG. 2.

Figure 8:
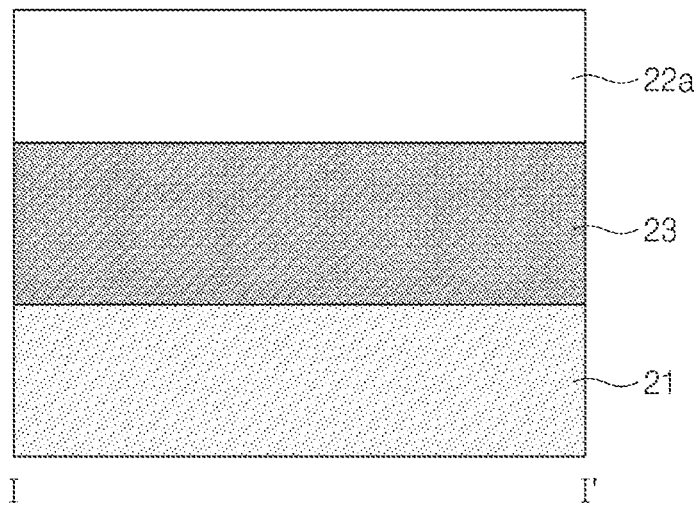
FIG. 8 to FIG. 11 are cross-sectional views of processes for the single-photon source device of FIG. 2.

Referring to FIG. 7 and FIG. 8, the substrate 21 is prepared (S10). The substrate 21 may include crystalline silicon. The lower clad layer 23 and a waveguide layer 22a may be formed on the substrate 21. The lower clad layer 23 may include silicon oxide. The waveguide layer 22a may include crystalline silicon. On the other hand, the substrate 21, the lower clad layer 23, the waveguide layer 22a may be prepared as an SOI (silicon on insulator) substrate.

Figure 9:
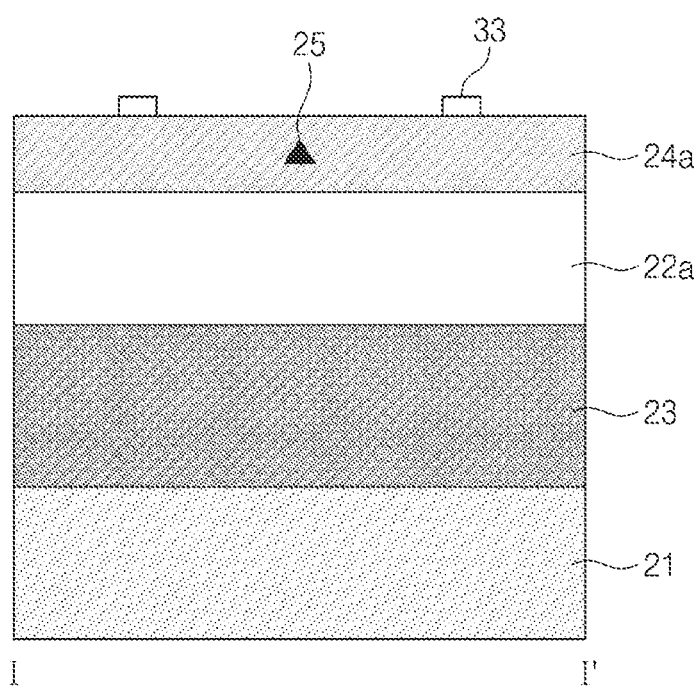

Referring to FIG. 7 and FIG. 9, a coupling layer 24a is formed (S20). The coupling layer 24a may include crystalline silicon carbide and/or epitaxial silicon carbide formed through a metal organic chemical vapor deposition method. As one example, the coupling layer 24a may have the first point defect 25. The first point defect 25 may be measured by an optical microscope or an electron microscope.

Next, a coordinate marker 33 with respect to the first point defect 25 is formed (S30). The coordinate marker 33 may indicate the position of the first point defect 25. The coordinate marker 33 may include dielectrics such as silicon nitride (SiN) and silicon oxide ($SiO_2$). On the other hand, the coordinate marker 33 may include a metal such as titanium (Ti), chromium (Cr), or gold (Au), but the embodiment of the inventive concept is not limited thereto. Although not illustrated, the coordinate marker 33 may have a grid shape. The coordinate marker 33 may have a spaced distance of about 5 μm to about 100 μm.

Figure 10:
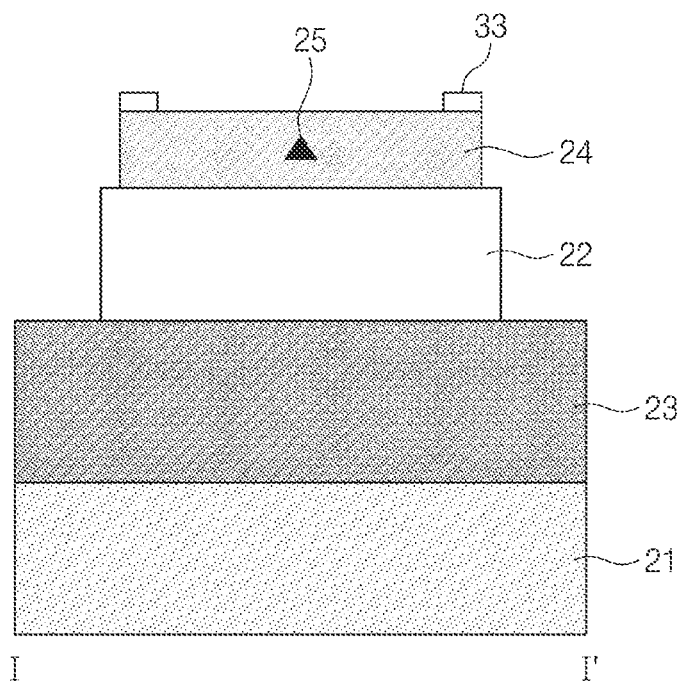

Referring to FIG. 7 and FIG. 10, the first coupling layer 24 is patterned (S40). The first coupling layer 24 may be patterned by an electron beam lithography process or a photolithography process. The first coupling layer 24 may have the first point defect 25. The first coupling layer 24 may include crystalline silicon carbide and/or epitaxial silicon carbide formed through a transferring method, but the embodiment of the inventive concept is not limited thereto.

Next, the straight waveguide 22 and the ring waveguide 26 are formed (S50). The straight waveguide 22 and the ring waveguide 26 may be formed by an electron beam lithography process for the waveguide layer 22a. On the other hand, the straight waveguide 22 and the ring waveguide 26 may be formed by a photolithography process and an etching process, but the embodiment of the inventive concept is not limited thereto. The straight waveguide 22 may have a width wider than that of the first coupling layer 24. The lower clad layer 23 may be exposed to the outside of the straight waveguide 22 and the ring waveguide 26.

Figure 11:
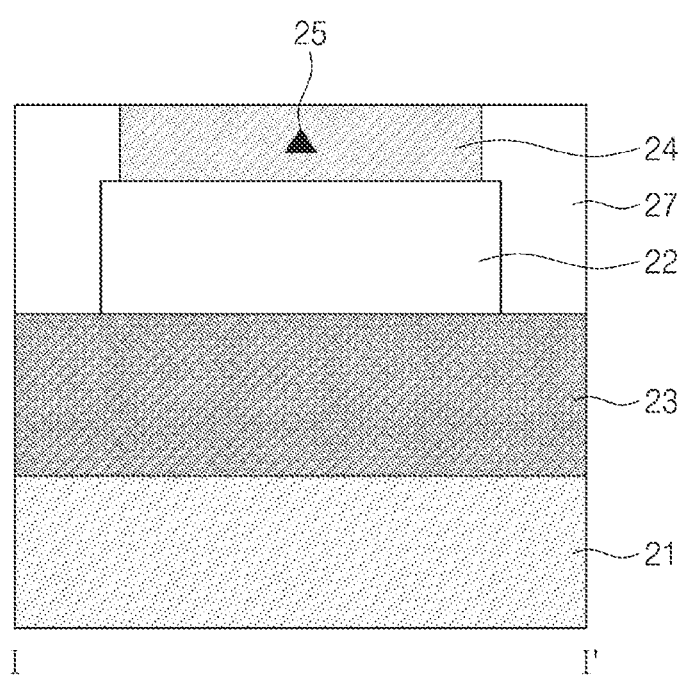

Referring to FIG. 7 and FIG. 11, the upper clad layer 27 is formed (S60). The upper clad layer 27 may be formed on the straight waveguide 22 and the lower clad layer 23 on the outside of the first coupling layer 24. The upper clad layer 27 may include silicon oxide formed through a chemical vapor deposition method. The coordinate marker 33 may be removed before or after the upper clad layer 27 is formed.

Referring to FIG. 2 and FIG. 7, the first electrodes 28 and the second electrode 29 are formed (S70). The first electrodes 28 and the second electrode 29 may be formed through a metal deposition process, a photolithography process, and an etching process. The first electrodes 28 may be formed on the first coupling layer 24 and the upper clad layer 27 on both sides of the first point defect 25. The second electrode 29 may be formed on the ring waveguide 26.

As described above, the single-photon source device according to the embodiment of the inventive concept may increase the extraction efficiency of the single photon by using the first point defect.

The foregoing description is about detailed examples for practicing the inventive concept. The present disclosure includes not only the above-described embodiments but also simply changed or easily modified embodiments. In addition, the present disclosure may include techniques which may be easily modified and practiced by using the embodiments described above.

What is claimed is:

1. A single-photon source device comprising:
a substrate;
a straight waveguide extending in a first direction on the substrate;
a first coupling layer which is provided on the straight waveguide and has a first point defect;
at least one first electrode which is adjacent to the first point defect and provided on the first coupling layer;
a ring waveguide which is adjacent to the straight waveguide and provided on the substrate;
at least one second electrode provided on the ring waveguide, and
a second coupling layer which is provided on the ring waveguide and has a second point defect,
wherein each of the first coupling layer and the second coupling layer comprises silicon carbide.

2. The single-photon source device of claim 1, wherein each of the first point defect and the second point defect comprises a silicon vacancy, a silicon di-vacancy, or a carbon antisite-vacancy pair.

3. The single-photon source device of claim 1, wherein each of the ring waveguide and the second coupling layer has a circular shape.

4. The single-photon source device of claim 1, wherein the first point defect and the second point defect are disposed adjacent to each other.

5. The single-photon source device of claim 4, wherein the first electrode is provided on one side of the first point defect, and
the second electrode is provided on another side of the second point defect and disposed inside the second coupling layer and the ring waveguide.

6. The single-photon source device of claim 1, wherein the first coupling layer has a ship shape.

7. The single-photon source device of claim 1, wherein each of the straight waveguide and the ring waveguide comprises silicon or silicon nitride.

8. The single-photon source device of claim 1, further comprising a lower clad layer below the straight waveguide and the ring waveguide,
wherein the lower clad layer comprises silicon oxide.

9. A single-photon source device comprising:
a substrate;
a lower clad layer provided on the substrate;
a straight waveguide which is provided on the lower clad layer and extends in a first direction;
a first coupling layer which is provided on the straight waveguide and has a first point defect;
a ring waveguide which is provided adjacent to the straight waveguide and disposed on the lower clad layer; and
a second coupling layer which is provided on the ring waveguide and has a second point defect adjacent to the first point defect, wherein each of the first coupling layer and the second coupling layer comprises silicon carbide.

10. The single-photon source device of claim 9, further comprising an upper clad layer which is provided on the lower clad layer outside of the straight waveguide and the ring waveguide.

11. The single-photon source device of claim 10, further comprising a first electrode which is provided on the first coupling layer and the upper clad layer on one side of the first point defect.

12. The single-photon source device of claim 11, further comprising a second electrode which faces the first electrode and is provided on the second coupling layer and the upper clad layer on another side of the second point defect.

13. The single-photon source device of claim 10, wherein each of the upper clad layer and the lower clad layer comprises silicon oxide.

14. A single-photon source system comprising:
a first light source configured to provide first light; and
a single-photon source device which is provided on one side of the first light source and uses the first light to generate a single photon,
wherein the single-photon source device comprises:
a substrate;
a straight waveguide extending in a first direction on the substrate;
a first coupling layer which is provided on the straight waveguide and has a first point defect;
at least one first electrode which is adjacent to the first point defect and provided on the first coupling layer;
a ring waveguide which is adjacent to the straight waveguide and provided on the substrate;
at least one second electrode provided on the ring waveguide, and
a second coupling layer which is provided on the ring waveguide and has a second point defect,
wherein each of the first coupling layer and the second coupling layer comprises silicon carbide.

15. The single-photon source system of claim 14, further comprising a second light source which is adjacent to the first light source and provides second light.

16. The single-photon source system of claim 15, wherein each of the first light source and the second light source comprises a light emitting diode or a laser diode.

17. The single-photon source system of claim 15, further comprising a beam splitter provided between the first light source and the second light source.

* * * * *